United States Patent Office 3,137,676
Patented June 16, 1964

---

3,137,676
POLYOLEFIN COMPOSITIONS STABILIZED WITH RHODANINE COMPOUNDS
Benjamin H. Smith, Jr., and Gordon C. Newland, Kingsport, Tenn., assignors to Eastman Kodak Company, Rochester, N.Y., a corporation of New Jersey
No Drawing. Filed Sept. 12, 1960, Ser. No. 55,157
20 Claims. (Cl. 260—45.8)

This invention relates to light stabilizers for polyolefins. More particularly, it relates to polyolefin compositions having improved stability against deterioration resulting from exposure to light.

Most organic plastic compositions undergo deterioration of one sort or another when exposed to sunlight. Conventional stabilizers such as phenylsalicylate, benzothiazole, and benzothiazoline derivatives serve to temporarily delay the embrittlement caused by prolonged periods of exposure of such compositions to sunlight. However, the protection afforded by the incorporation of such stabilizers in polyolefins is of limited duration and therefore unsatisfactory for purposes of stabilization against light for the months and years of use required of polyolefin compositions, especially in such applications as plastic pipes, conduits, lawn furniture, film, and the like.

It is accordingly an object of this invention to provide a light stabilizer for polyolefins which gives improved protection for longer periods of time.

It is another object of this invention to provide a light stabilizer which has good compatibility with polyolefins and gives them substantial protection against deterioration due to exposure to sunlight.

It is a further object of this invention to provide a polyolefin composition having improved stabilization against embrittlement when fashioned as a sheet or film.

We have found unexpectedly that rhodanine compounds having a structural formula represented by

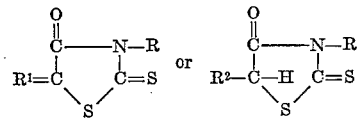

wherein R is hydrogen, amino, benzylideneamino, p-methoxybenzylideneamino, or salicylideneamino, R¹ is benzylidene, p-methoxy-benzylidene, p-hydroxybenzylidene, p-chlorobenzylidene, p-dimethylaminobenzylidene, or p-dimethylaminophenylimino and R² is hydrogen or p-chloro-2'-nitrophenylazo are highly effective light stabilizers when incorporated in polyolefins. We are unable to explain why rhodanine compounds not coming within the scope of the preceding formula do not impart this surprising high light stability to polyolefins.

Representative rhodanine compounds included by the formula given above which we have found to be highly successful in retarding disintegration caused by long exposure to light are rhodanine, 5-(p-chlorobenzylidene) rhodanine, 3-amino - 5 - (p - chloro-2'-nitrophenylazo) rhodanine, 5-(p-chloro-2'-nitrophenylazo)rhodanine, 5-(p-hydroxybenzylidene)rhodanine, 3-aminorhodanine, 5-(p-methoxybenzylidene)rhodanine, 5-benzylidenerhodanine, 5-(p - dimethylaminophenylimino)rhodanine, 5 - (p-dimethylaminobenzylidene)rhodanine, 5-benzylidene-3-salicylideneaminorhodanine, 5-(p-methoxybenzylidene)-3-(p-methoxybenzylideneamino)rhodanine, and 3-benzylideneaminorhodanine.

The additives of the present invention lend to polyolefin compositions improved stability, and more specifically, improved stability against deterioration resulting from exposure to sunlight or ultraviolet light. Thus, polyolefins stabilized in accordance with the invention have an extended life expectancy and can be used more effectively than unstabilized polyolefins for a wide diversity of uses, including outdoor uses requiring prolonged exposure to the elements. Polyolefins stabilized in accordance with the invention can be cast, extruded, rolled or molded into sheets, rods, tubes, piping, filaments and other shaped articles, including the widely used films of the polymer about .5 to 100 mils in thickness. The present compositions can be used for coating paper, wire, metal foil, glass fiber, fabrics, synthetic and natural textiles and other such materials. Likewise, small amounts of other additives such as other polymers, resins or plastics, as well as other stabilizers or inhibitors that are commonly added to polyolefins for specific uses are not deleterious to the effectiveness of the present rhodanine compound additives.

The rhodanine compounds of this invention can be used to stabilize a wide variety of polyolefin compositions against deterioration resulting from exposure to ultraviolet light. Any of the normally solid polymers of α-monoolefinic aliphatic hydrocarbons containing 2 to 10 carbon atoms can be stabilized in accordance with the invention. The subject stabilizer combination is preferably used in polypropylene and polyethylene, particularly polypropylene, although such polyolefins as poly 4-methylpentene-1, poly 3-methylbutene-1, poly 3,3-dimethylbutene-1, poly 3,3,5-trimethylheptene-1, poly decene-1 and the like are included in the invention. Both the so-called "low density" and "high density" polyolefin compositions can be stabilized in accordance with the invention. "Low density" polyethylenes usually have densities of .91 to .93, and "high density" polyethylenes usually have densities of .94 to .97. A typical "low density" polypropylene has a density of .85 and a typical "high density" polypropylene has a density of .92. The densities of other polyolefins are known in the art. Reference is made to Fawcett et al., U.S. Patent No. 2,153,553, granted April 11, 1939, and to copending application Coover et al., U.S. Serial No. 729,904, filed March 31, 1958, with regard to the preparation of various polyolefin compositions that can be stabilized against light deterioration with the subject sabilizers. The subject stabilizers can be used as light deterioration inhibitors for the more common solid resinous polyolefin compositions having average molecular weights of at least 15,000 and more usually at least 20,000, as well as the so-called polyolefin waxes having lower molecular weights, usually 1,000–12,000.

Rhodanine and the rhodanine derivatives found to be efficient light stabilizers in polyolefins according to the present invention can be prepared by procedures known to the art from economical starting materials such as carbon disulfide, ammonia, hydrazine, substituted anilines, aliphatic amines, substituted benzaldehydes, and ethyl or sodium chloroacetate. The general methods for preparing the stabilizers of the invention are illustrated by the following description.

Rhodanine is prepared by reacting ammonia with carbon disulfide to form ammonium dithiocarbamate, reacting the dithiocarbamate with sodium chloroacetate, and acidifying, as described by Horning on page 763 of Organic Syntheses, Coll. vol. III, John Wiley and Sons, New York, 1955. The reactions may be illustrated by the following equations.

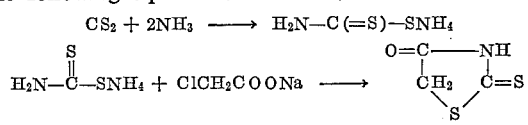

3-aminorhodanine is prepared by the addition of carbon disulfide to hydrazine to form an adduct salt which is then further treated with ethyl chloroacetate [Ueda and Ohte, Nippon Kogaku Zasshi, 77, 385 (1956)]. The reactions are as follows:

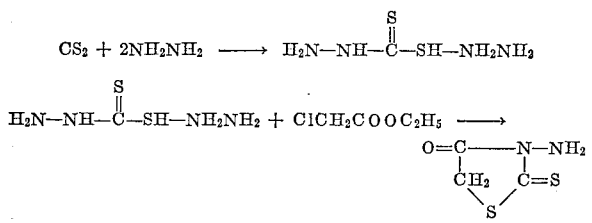

The 3-substituted rhodanines are prepared by a modification of the rhodanine preparation procedure wherein an aniline or an aliphatic amine is used in addition to ammonia in the first step. The 5-substituted rhodanines may be prepared by condensation of the appropriate aromatic aldehyde [Brown et al., J. Am. Chem. Soc. 73, 2357(1951)] or aromatic nitroso compound [Garancher, Helv. Chim. Acta 3, 159 (1920)], using acetic acid as the solvent or by other conventional methods. The following equations are illustrative of one such condensation, R being, for example, hydrogen, amino, benzylideneamino, p-methoxybenzylideneamino, or salicyclideneamino and $R^3$ being, for example, Cl, OH, or $OCH_3$.

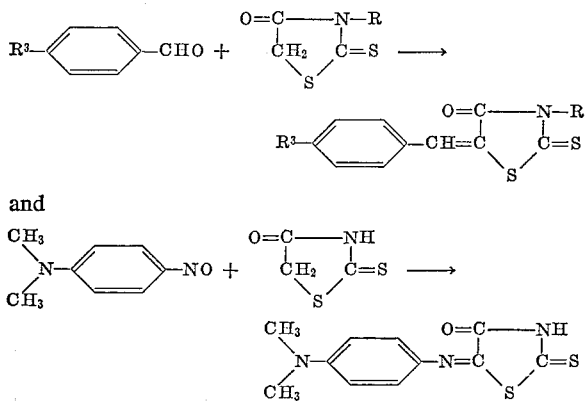

The stabilizing amount of the rhodanine compound additives of this invention varies with the particular use to which the polyolefin in which they are incorporated is to be put. A stabilizing amount is a minor amount, at least 0.001%, and concentrations of from about 0.1% to about 10% are generally used, from about 0.5 to about 5% being preferred, the concentration being based upon the weight of the particular polyolefin. Concentrations of about 5% by weight are generally most effective.

The stabilizer of this invention may be incorporated in polyolefins by any of the conventional mixing procedures, e.g., by addition to a dope of the polymer in an appropriate solvent, as in the examples to follow. Other suitable methods which can be used include milling on heated rolls and dry blending.

The following examples illustrate further the novelty, utility, and unobviousness of the present invention, but it is not intended that they unduly limit the same. The polypropylene used in the examples had a density of 0.91 and an average molecular weight of 61,000 unless otherwise specified. Except where otherwise indicated, in the following examples 5 percent by weight concentrations of additives were used.

*Example 1.—Polypropylene Stabilized With 5-(p-Chlorobenzylidene)-Rhodanine*

A solution of 28.2 g. of p-chlorobenzaldehyde, 26.6 g. of rhodanine, and 50 g. of fused sodium acetate in 300 ml. of glacial acetic acid was refluxed for two hours. The reaction mixture was diluted with 800 ml. of cold water. The crude product was separated and washed with water. The product was recrystallized from dioxane-ethanol to give a 95% yield or 48.8 g. of 5-(p-chlorobenzylidene)rhodanine with a melting point of 227° C. to 228° C. The 5-(p-chlorobenzylidene)rhodanine was then evaluated as a light stabilizer. A dope of the polymer was prepared containing 0.4 g. of polypropylene powder and 0.02 g. of the 5-(p-chlorobenzylidene)rhodanine in 10 ml. of tetralin and heated for one hour, with mixing, at 145° C. The dope was then cast onto a ferro-type plate which was heated to 143° C. and the solvent evaporated. The plate and the resulting film were quenched in water, and the film was peeled from the plate. A control was prepared in a similar manner containing 0.4 g. of polypropylene powder but no additive. Both specimens, each measuring 2.5 by 0.5 inch, were exposed to artificial weathering in a modified Atlas Twin-Arc Weather-Ometer such as that described in Anal. Chem., 25, 460 (1953). The specimen containing no additive became brittle when creased after 23.6 hours. The specimen containing additive, on the other hand, became brittle when creased only after 260 hours of exposure. The stabilization efficiency rating as calculated by the formula $T_s/T_u$, wherein $T_s$ is the time required for the stabilization to become brittle and $T_u$ the time required for the unstabilized specimen to become brittle, was 11.0.

*Example 2.—Polypropylene Stabilized With 3-Benzylideneaminorhodanine*

A solution of 22.0 g. of benzaldehyde and 29.6 g. of 3-aminorhodanine in 80 ml. of ethanol was refluxed for one hour. The reaction mixture was cooled and the crude product isolated in 80% yield. Recrystallization from a benzene-heptane mixture gave 25.8 g. of 3-benzylideneaminorhodanine with a melting point about 136° C. A comparison of the calculated amounts of elements in the formula and the amounts actually found gave the following percentage results.

Calcd. for $C_{10}H_8N_2OS_2$: C, 50.82; H, 3.41; N, 11.86. Found: C, 50.87; H, 3.60; N, 11.64.

The product was compounded and tested in polypropylene film as in Example 1. The stabilization efficiency rating calculated according to the formula given in Example 1 was 7.8.

*Example 3.—Polypropylene Stabilized With 5-Benzylidene-3-Aminorhodanine*

A solution of 31.8 g. of benzaldehyde, 44.4 g. of 3-aminorhodanine, and 75 g. of fused sodium acetate in 250 ml. of glacial acetic acid was refluxed for 15 min. The reaction mixture was diluted with one liter of cold water. The crude solid was separated and was washed with water. It was recrystallized from glacial acetic acid to give 34.3 g. (48% yield) of 5-benzylidene-3-aminorhodanine, melting point 194–197° C. The product was compounded and evaluated in polypropylene film as in Example 1. The stabilization efficiency rating was 6.7.

*Example 4.—Polypropylene Stabilized With 5-(p-Methoxybenzylidene)-3-(p - Methoxybenzylideneamino) Rhodanine*

A solution of 27.2 g. of anisaldehyde, 14.8 g. of 3-aminorhodanine, and 50 g. of fused sodium acetate in 150 ml. of glacial acetic acid was refluxed for two hours. The reaction mixture was diluted with 800 ml. of cold water. The crude product was obtained in 87% yield. A recrystallization from dioxane gave 23.2 g. (70% yield) of 5-(p-methoxybenzylidene)-3-(p-methoxybenzylideneamino)rhodanine, melting point 189–194° C. The product was compounded and evaluated in polypropylene film as in Example 1. The sabilization efficiency rating was 10.0.

*Example 5.—Comparison of Stabilization Efficiency Rating of Rhodanine Compounds With Thiazolidinone and Thiazolidinedione*

A comparison was made of the stabilization efficiency ratings of typical rhodanine compound additives of this invention with certain thiazolidinones and thiazolidinediones. The results of this comparison are given in the following table (Table I). Samples were incorporated in polypropylene as in Example 1 and the film tests made in accordance with the procedure thereof. The surprising results obtained by our rhodanine compounds are evident at a glance.

TABLE I

| Stabilizer: | Stabilization efficiency rating based on retardation of embrittlement |
|---|---|
| None | 1.0 |
| 2,4-thiazolidinedione | 1.0 |
| 2-imino-4-thiazolidinone | 5.0 |
| 3-aminohhodanine | 7.8 |
| Rhodanine | 9.6 |
| 5-p-chloro-benzylidene rhodanine | 11.0 |
| 3-amino-5-(4'-chloro-2'-nitrophenylazo) rhodanine | 10.6 |
| 5-(4'-chloro-2'-nitrophenylazo)rhodanine | 12.0 |

*Example 6.—Stabilization Efficiency Ratings of Rhodanine Compound Additivies in Polypropylene*

To illustrate their superiority when used as light stabilizers, representative rhodanine compounds coming within the scope of this invention were incorporated and tested in polypropylene in accordance with the procedure in Example 1 and compared as to their stabilization efficiency rating with other rhodanine compounds similarly incorporated and tested in polypropylene. The results of these tests are given in Tables II, III and IV which follow.

TABLE II

| Stabilizer: | Stabilization efficiency rating based on retardation of embrittlement |
|---|---|
| None | 1.0 |
| 5-(m-nitrobenzylidene)rhodanine | 2.8 |
| 5-(p-nitrobenzylidene)rhodanine | 2.8 |
| 5-cinnamylidenerhodanine | 2.8 |
| 5-isopropylidenerhodanine | 3.3 |
| 5-(2'-furylidene)rhodanine | 3.8 |
| 5-salicylidenerhodanine | 4.2 |
| 5-cyclohexylidenerhodanine | 4.7 |
| 5-(p-methoxybenzylidene)rhodanine | 7.2 |
| 5-benzylidenerhodanine | 7.8 |
| 5-(p-dimethylaminophenylimino)rhodanine | 8.0 |
| 5-(p-dimethylaminobenzylidene)rhodanine | 9.0 |
| Rhodanine | 9.6 |
| 5-(p-hydroxybenzylidene)rhodanine | 10.0 |
| 5-(p-chlorobenzylidene)rhodanine | 11.0 |

TABLE III

| Stabilizer: | Stabilization efficiency rating based on retardation of embrittlement |
|---|---|
| None | 1.0 |
| 3-phenylrhodanine | 2.8 |
| 5-(p-chlorobenzylidene)-3-(p-chlorobenzylideneamino)rhodanine | 3.3 |
| 5-benzylidene-3-phenylrhodanine | 4.7 |
| 5-(p-dimethylaminobenzylidene)-3-phenylrhodanine | 4.7 |
| 5-(p-dimethylaminobenzylidene)-3-p-dimethylaminobenzylideneamino)rhodanine | 4.9 |
| 3-amino-5-benzylidenerhodanine | 6.7 |
| 3-salicylideneaminorhodanine | 6.7 |
| 3-aminorhodanine | 7.8 |
| 3-benzylideneaminorhodanine | 7.8 |
| 5-benzylidene-3-salicylideneaminorhodanine | 7.8 |
| 5-(p-methoxybenzylidene)-3-(p-anisylideneamino)rhodanine | 10.0 |

*Example 7.—Comparison of Stabilization Efficiency Ratings of the Three Ring Systems of Rhodanine, 2,4-Thiazolidinedione and 2-Imino-4-Thiazolidinone Compounds as Additives in Polypropylene*

The unexpected superiority of representative 5-substituted rhodanine derivatives as light stabilizers for polyolefins was indicated by a series of tests in which comparable 5-substituted 2,4-thiazolidinedione and 2-imino-4-thiazolidinone compounds were compared therewith by incorporation and testing in polypropylene as in Example 1. The results of this comparision are indicated in the following table (Table IV).

TABLE IV

| 5-Substituent | Stabilization Efficiency Based on Retardation of Embrittlement | | |
|---|---|---|---|
| | Rhodanine | 2,4-Thiazolidine-dione | 2-Imino-4-thiazolidinone |
| No stabilizer | 1.0 | 1.0 | 1.0 |
| No substituent, i.e. parent | 9.6 | 1.0 | 5.0 |
| p-Methoxybenzylidene- | 7.2 | 3.0 | |
| Benzylidene- | 7.8 | 2.0 | 1.5 |
| p-Dimethylamino-phenylimino- | 8.0 | | |
| p-Dimethylamino-benzylidene- | 9.0 | 1.0 | |
| p-Hydroxybenzylidene- | 10.0 | 5.0 | 1.5 |
| p-Chlorobenzylidene- | 11.0 | 1.0 | |

*Example 8.—Comparative Stability Effect of Rhodanine on Various Polyolefins*

A comparison was made of the effect of adding rhodanine to representative solid plastic grade polyolefins having an average molecular weight of at least 15,000. Films 3 mils thick were prepared in accordance with the procedure given in Example 1, with the exception that a 10% by weight concentration of the additive was used in the case of the second 3-methylbutene-1. Both the stabilized and unstabilized films were exposed to artificial weathering as described in Example 1. The results in this case are indicated in exposure hours required for embrittlement rather than in stabilization efficiency ratings. The data obtained by this test are summarized in Table V below. It can be seen at once that the rhodanine additives improved the stability of all of the polyolefins in which they were used.

TABLE V

| Base Polymer | Additive | Exposure Hours Required for Embrittlement |
|---|---|---|
| Polypropylene | None | 23.6 |
| 3-Methylbutene-1 | do | 19 |
| 4-Methylpentene-1 | do | 19 |
| Polypropylene | Rhodanine | 236 |
| 3-Methylbutene-1 | do | 189 |
| 4-Methylpentene-1 | do | 71 |
| 3-Methylbutene-1 | do | 189 |

*Example 9.—Rhodanine Compound Additives in Polyethylene*

Representative rhodanine compound additives of this invention were roll-compounded into solid plastic-grade polyethylene having a 0.92 density and an average molecular weight of at least 15,000 in a concentration of one part per 100 parts of polymer. The rear roll was held at 220° F. and the front roll at 270° F. for a milling time of four minutes. Flat plates .048 inch thick were compression-molded from the roll mix and exposed outdoors in Kingsport, Tennessee. Measurements of tensile elongation at 2000% per minute were made after six months of outdoor exposure. The outstanding retention of elongation by the compositions containing the rhodanine compounds after this prolonged period of outdoor exposure is readily observed in the results given in the following table.

TABLE VI

| Stabilizer: | Percent of initial elongation retained after 6 mo. outdoor exposure |
|---|---|
| None | 19 |
| 3-amino-5-benzylidenerhodanine | 30 |
| 5-methoxybenylidenerhodanine | 75 |
| 5-(p-dimethylaminobenzylidene)rhodanine | 95 |
| 5-benzylidenerhodanine | 94 |
| 3-benzylideneaminorhodanine | 84 |
| 5-(p-hydroxybenzylidene)rhodanine | 94 |
| 3-aminorhodanine | 100 |
| Rhodanine | 100 |

*Example 10.—The Effect of a Lowered Concentration of Rhodanine Compounds Used in Polypropylene*

Several rhodanine derivatives were also roll-compounded into polypropylene at a concentration of 1%. A milling time of 6 minutes with the front roll held at 190° C. and the rear roll at 175° C. was employed. Plates .048 inch thick were compression-molded from the roll mix and exposed to artificial weathering in a modified Atlas Twin-Arc Weather-Ometer such as that used in Example 1. The photo-oxidation was followed by tensile elongation measurements. The results of these tests, in all cases showing surprising retention of elongation after exposure of polypropylene containing the rhodanine compounds, are recorded in Table VII.

TABLE VII

| Stabilizer: | Percent of initial elongation retained after 100 hr. exposure |
|---|---|
| None | 29 |
| 3-amino-5-benzylidenerhodanine | 50 |
| 5-methoxybenzylidenerhodanine | 50 |
| 5-(p-chlorobenzylidene)rhodanine | 47 |
| 3-benzylideneaminorhodanine | 40 |
| 5-(p-hydroxybenzylidene)rhodanine | 60 |
| 3-aminorhodanine | 61 |
| Rhodanine | 56 |

*Example 11.—Effect of Varying the Concentration of Rhodanine Compound Additives in Polypropylene*

Polypropylene films 3 mils thick were prepared as described in Example 1. The concentration of additives was varied over a range of 0.5 to 16%. The films were exposed to artificial weathering according to the procedure of Example 1 and the stabilization efficiency ratings determined in accordance therewith. The substantially uniform improvement shown by thus varying the concentration of three illustrative rhodanine compound additives of this invention over a broad range is indicated in the following table (Table VIII). The stabilization efficiency ratings are based upon a rating of 1.0 for polypropylene containing no additive.

TABLE VIII

| Stabilizer | Concentration, Percent | Stabilization Efficiency Rating |
|---|---|---|
| Rhodanine | 0.5 | 4.0 |
| Do | 1.0 | 4.0 |
| Do | 2.0 | 6.0 |
| Do | 4.0 | 8.0 |
| Do | 5.0 | 9.6 |
| Do | 8.0 | 6.0 |
| 3-Aminorhodanine | 0.5 | 4.0 |
| Do | 1.0 | 4.0 |
| Do | 2.0 | 6.0 |
| Do | 4.0 | 6.0 |
| Do | 5.0 | 7.8 |
| Do | 8.0 | 8.0 |
| Do | 16.0 | 13.0 |
| 5-(p-Chloro-2'-nitrophenylazo) rhodanine | 0.5 | 1.0 |
| Do | 1.0 | 2.0 |
| Do | 2.0 | 4.0 |
| Do | 4.0 | 4.0 |
| Do | 5.0 | 12.0 |
| Do | 8.0 | 6.0 |

This invention has been described in detail with particular reference to preferred embodiments thereof, but it will be understood that variations and modifications can be effected within the spirit and scope of the invention as described hereinabove and as defined in the appended claims.

We claim:

1. A polyolefin composition comprising a polymer of an α-monoolefin hydrocarbon having from 2 to 10 carbon atoms containing from about 0.1 to about 10% by weight based on said polyolefin of a stabilizer comprising a rhodanine compound having a structural formula selected from the group consisting of

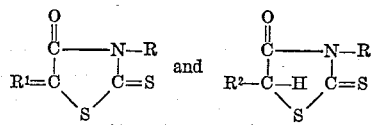

wherein R is selected from the group consisting of hydrogen, amino, benzylideneamino, p-methoxybenzylideneamino, and salicylideneamino, $R^1$ is selected from the group consisting of benzylidene, p-methoxybenzylidene, p-hydroxybenzylidene, p-chlorobenzylidene, p-dimethylaminobenzylidene, and p-dimethylaminophenylimino, and $R^2$ is selected from the group consisting of hydrogen and p-chloro-2'-nitro-phenylazo.

2. A polyolefin composition comprising a polyolefin selected from the group consisting of polypropylene, polyethylene, 3-methylbutene-1, and 4-methylpentene-1, containing from about 0.1% to about 10% by weight based on said polyolefin of a rhodanine compound stabilizer selected from a group consisting of 5-p-chloro-benzylidene rhodanine, 3-amino-5-(p-chloro-2'-nitrophenylazo)rhodanine, 5-(p-chloro-2'-nitrophenylazo)rhodanine, 5-p-hydroxybenzylidene)rhodanine, 3-amino-rhodanine, 5-(p-methoxybenzylidene)rhodanine, 5-benzylidenerhodanine, 5-(p-dimethylaminophenylimino)rhodanine, 5-(p-dimethylaminobenzylidene)rhodanine, 5-benzylidene-3-salicylideneaminorhodanine, 5-(p-methoxybenzylidene)-3-(p-methoxybenzylideneamino)rhodanine, and 3-benzylideneaminorhodanine.

3. A polyolefin composition comprising a polyolefin selected from the group consisting of polypropylene, polyethylene, 3-methylbutene-1, and 4-methylpentene-1, containing from about 0.1% to about 10% by weight based on said polyolefin of rhodanine.

4. A polyolefin composition comprising a polyolefin selected from the group consisting of polypropylene, polyethylene, 3-methylbutene-1, and 4-methylpentene-1, containing from about 0.1% to about 10% by weight based on said polyolefin of 5-(p-chlorobenzylidene)rhodanine.

5. A polyolefin composition comprising a polyolefin selected from the group consisting of polypropylene, polyethylene, 3-methylbutene-1, and 4-methylpentene-1, containing from about 0.1% to about 10% by weight based on said polyolefin of 5-(p-hydroxybenzylidene)rhodanine.

6. A polyolefin composition comprising a polyolefin selected from the group consisting of polypropylene, polyethylene, 3-methylbutene-1, and 4-methylpentene-1, containing from about 0.1% to about 10% by weight based on said polyolefin of 3 amino-5-(p-chloro-2'-nitrophenylazo)rhodanine.

7. A polyolefin composition comprising a polyolefin selected from the group consisting of polypropylene, polyethylene, 3-methylbutene-1, and 4-methylpentene-1, containing from about 0.1% to about 10% by weight based on said polyolefin of 5-(p-chloro-2'-nitrophenylazo)rhodanine.

8. A polyolefin composition comprising polypropylene containing from about 0.1% to about 10% by weight based on said polypropylene of a stabilizer comprising a rhodanine compound represented by the general structural formula selected from the group consisting of

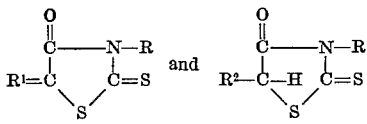

wherein R is selected from the group consisting of hydrogen, amino, benzylideneamino, p-methoxybenzylideneamino, and salicylideneamino, $R^1$ is selected from the group consisting of benzylidene, p-methoxybenzylidene, p-hydroxybenzylidene, p-chlorobenzylidene, p-dimethylaminobenzylidene, and p-dimethylaminophenylimino, and $R^2$ is selected from the group consisting of hydrogen and p-chloro-2'-nitro-phenylazo.

9. A polyolefin composition comprising polypropylene containing from about 0.1% to about 10% by weight based on said polypropylene of 3-amino-5-(p-chloro-2'-nitrophenylazo)rhodanine.

10. A polyolefin composition comprising polypropylene containing from about 0.1% to about 10% by weight based on said polypropylene of 5-(p-chloro-2'-nitrophenylazo)rhodanine.

11. A polyolefin composition comprising polypropylene containing from about 0.1% to about 10% by weight based on said polypropylene of 5 - (p - hydroxybenzylidene)rhodanine.

12. A polyolefin composition comprising polypropylene containing from about 0.1% to about 10% by weight based on said polypropylene of 3-aminorhodanine.

13. A polyolefin composition comprising polypropylene containing from about 0.1% to about 10% by weight based on said polypropylene of 5 - (p - hydroxybenzylidene)rhodanine.

14. A polyolefin composition comprising polyethylene containing from about 0.1 to about 10% by weight based upon said polyethylene of a stabilizer comprising a rhodanine compound represented by the general structural formula selected from the group consisting of

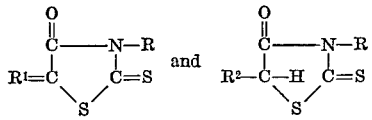

wherein R is selected from the group consisting of hydrogen, amino, benzylideneamino, p-methoxybenzylideneamino, and salicylideneamino, $R^1$ is selected from the group consisting of benzylidene, p-methoxybenzylidene, p-hydroxybenzylidene, p-chlorobenzylidene, p-dimethylaminobenzylidene, and p-dimethylaminophenylimino, and $R^2$ is selected from the group consisting of hydrogen and p-chloro-2'-nitro-phenylazo.

15. A polyolefin composition comprising polyethylene containing from about 0.1% to about 10% by weight based upon said polyethylene of 3-amino-5-(p-chloro-2'-nitrophenylazo)rhodanine.

16. A polyolefin composition comprising polyethylene containing from about 0.1% to about 10% by weight based upon said polyethylene of 5-(p - chloro - 2' - nitrophenylazo)rhodanine.

17. A polyolefin composition comprising polyethylene containing from about 0.1% to about 10% by weight based upon said polyethylene of 5 - (p - hydroxybenzylidene)rhodanine.

18. A polyolefin composition comprising polyethylene containing from about 0.1% to about 10% by weight based upon said polyethylene of 3-aminorhodanine.

19. A polyolefin composition comprising polyethylene containing from about 0.1% to about 10% by weight based upon said polyethylene of 5 - (p - methoxybenzylidene)rhodanine.

20. A method of stabilizing a polyolefin composition comprising a polyolefin prepared from an α-monoolefin hydrocarbon having 2 to 10 carbon atoms which comprises incorporating in said polyolefin composition from about 0.1% to about 10% by weight based on said polyolefin of a rhodanine compound represented by the general structural formula selected from the group consisting of

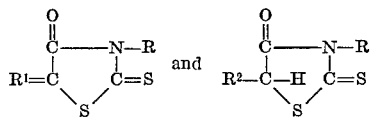

wherein R is selected from the group consisting of hydrogen, amino, benzylideneamino, p - methoxybenzylideneamino, and salicylideneamino, $R^1$ is selected from the group consisting of benzylidene, p-methoxybenzylidene, p-hydroxybenzylidene, p-chlorobenzylidene, p-dimethylaminobenzylidene, and p-dimethylaminophenylimino, and $R^2$ is selected from the group consisting of hydrogen and p-chloro-2'-nitro-phenylazo.

References Cited in the file of this patent
UNITED STATES PATENTS

| | | |
|---|---|---|
| 2,739,971 | Sawdey et al. | Mar. 27, 1956 |
| 2,796,404 | Levin | June 18, 1957 |
| 2,949,464 | Strube | Aug. 16, 1960 |
| 2,957,869 | Strube | Oct. 25, 1960 |
| 2,987,503 | Van Allan et al. | June 6, 1961 |

UNITED STATES PATENT OFFICE
CERTIFICATE OF CORRECTION

Patent No. 3,137,676                                            June 16, 1964

Benjamin H. Smith, Jr., et al.

It is hereby certified that error appears in the above numbered patent requiring correction and that the said Letters Patent should read as corrected below.

Column 2, lines 44 and 45, for "sabilizers" read -- stabilizers --; column 4, line 25, for "stabilization" read -- stabilized specimen --; column 5, line 20, for "3-aminohhodanine" read -- 3-aminorhodanine --.

Signed and sealed this 30th day of March 1965.

(SEAL)
Attest:

ERNEST W. SWIDER                                       EDWARD J. BRENNER
Attesting Officer                                          Commissioner of Patents

UNITED STATES PATENT OFFICE

CERTIFICATE OF CORRECTION

Patent No. 3,137,676            June 16, 1964

Benjamin H. Smith, Jr., et al.

It is hereby certified that error appears in the above numbered patent requiring correction and that the said Letters Patent should read as corrected below.

Column 2, lines 44 and 45, for "sabilizers" read -- stabilizers --; column 4, line 25, for "stabilization" read -- stabilized specimen --; column 5, line 20, for "3-aminohhodanine" read -- 3-aminorhodanine --.

Signed and sealed this 30th day of March 1965.

(SEAL)
Attest:

ERNEST W. SWIDER
Attesting Officer

EDWARD J. BRENNER
Commissioner of Patents